United States Patent [19]

Ziegler

[11] 3,925,039

[45] Dec. 9, 1975

[54] SYSTEM FOR TREATING FLUE GAS
[75] Inventor: Donald L. Ziegler, Golden, Colo.
[73] Assignee: The United States of America as represented by the United States Energy Research and Development Administration, Washington, D.C.
[22] Filed: Nov. 18, 1974
[21] Appl. No.: 525,042

[52] U.S. Cl. .............. 55/223; 55/229; 55/233; 55/238; 261/79 A; 261/DIG. 54; 261/94; 261/DIG. 72
[51] Int. Cl.[2] .............. B01D 47/10; B01D 47/14; B01D 47/16
[58] Field of Search ............ 55/223, 226, 227, 229, 55/233, 234, 235, 236, 237, 238, 239, 240, 257, 267, DIG. 41, 241, 228, 268; 261/17, 79 A, 94, DIG. 9, DIG. 54, DIG. 72; 110/119

[56] References Cited
UNITED STATES PATENTS

| 2,238,824 | 4/1941 | Ryner | 55/236 X |
|---|---|---|---|
| 2,687,184 | 8/1954 | Hutchinson et al. | 55/229 X |
| 2,972,393 | 2/1961 | Bush | 261/DIG. 54 X |
| 3,148,042 | 9/1964 | Harnisch et al. | 55/267 X |
| 3,212,235 | 10/1965 | Markant | 55/238 X |
| 3,348,825 | 10/1967 | McIlvaine | 55/233 X |
| 3,439,724 | 4/1969 | Mason | 55/223 X |
| 3,687,630 | 8/1972 | Taylor | 55/229 X |

FOREIGN PATENTS OR APPLICATIONS

| 516,350 | 1/1940 | United Kingdom | 55/229 |
|---|---|---|---|

*Primary Examiner*—Frank W. Lutter
*Assistant Examiner*—David L. Lacey
*Attorney, Agent, or Firm*—Dean E. Carlson; Dudley W. King; Igancio Resendez

[57] ABSTRACT

A system for treating or cleaning incinerator flue gas containing acid gases and radioactive and fissionable contaminants wherein flue gas and a quench solution are fed into a venturi and thereafter tangentially into a receptacle having a lower portion for receiving flue gas and a quenching or cooling solution, and for restricting volumetric content of the solution in the lower portion of the elongated receptacle, with an upper portion containing a scrub bed to further treat or clean the flue gas.

7 Claims, 4 Drawing Figures

SYSTEM FOR TREATING FLUE GAS

BACKGROUND OF INVENTION

The invention relates to a system for cleaning large volumes of incinerator flue gas containing acid gases and radioactive and fissionable contaminants.

Combustible waste such as rubber gloves, plastic bags, and the like which may contain radioactive and fissionable contaminants, may be burned in order to reduce the volume of waste requring processing for proper disposal, for concentration and recovery of radioactive contaminants, etc. The burning or incineration process generates large volumes of flue gas which require cooling, cleaning of acid gases, and removal and recovery of radioactive contaminants.

Incinerators which can burn the above combustible waste at the rate of about 150 pounds per hour produce from about 800 to about 1500 standard cubic feet per minute (SCFM) of flue gas during operation. Apparatus capable of remaining criticality safe and able to handle the large volumes such as in excess of about 100 SCFM of flue gas generated during incineration of combustible materials containing radioactive fissionable materials are not known. For example, prior art standard settling chambers or cyclones may handle only about 50 SCFM as a maximum and still be criticality safe or subcritical. Subcritical or criticality safe is defined as a condition wherein a mass of active material only supports a nonsustaining chain reaction.

SUMMARY OF INVENTION

In view of the above prior art limitations, it is an object of this invention to provide a criticality safe system and apparatus for continuous cleaning of large volumes of flue gas generated from burning combustible waste materials having radioactive fissionable contaminants.

It is a further object of this invention to provide a system for recovering radioactive materials from flue gas generated in burning combustible waste materials having radioactive contaminants.

Various other objects and advantages will appear from the following description of the invention and the most novel features will be particularly pointed out hereinafter in connection with the appended claims. It will be understood that various changes in the details, layout and materials as are herein described and illustrated in order to explain the nature of the invention may be made by those skilled in the art without departing from the scope of the invention.

The invention comprises a criticality safe system and apparatus for removing and recovering radioactive and fissionable contaminants such as plutonium and uranium from large volumes of gases emitted during the burning of combustible wastes containing these contaminants, wherein a venturi scrubber entraps particles from the gases in a quench liquid, conduits tangentially transfer the gas and quench liquid into the lower portion of a generally vertical, elongated container having an interior cylindrical wall at this lower portion and a hollow cylindrical wall member coaxially disposed within the container and spaced from the interior cylindrical wall forming therewith an annular chamber for spreading the volumetric quantity of quench liquid that may be accumulated, and the container upper portion has a bed of scrub material through which a downwardly flowing scrub liquid scrubs and removes remaining particles from the gas. The system also incorporates means for cooling and recycling the quench and scrub solutions.

DETAILED DESCRIPTION

Figure 1:
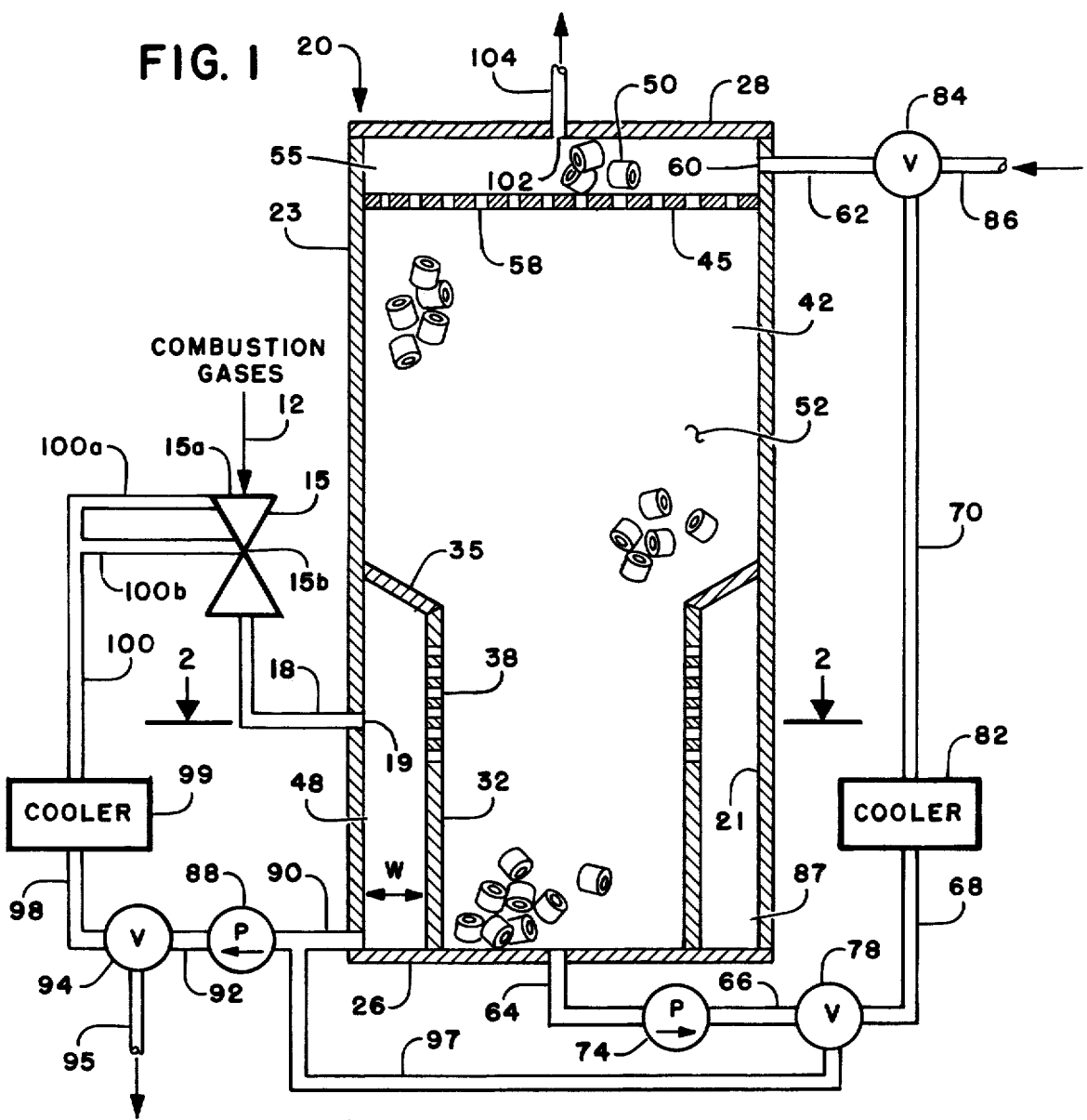
FIG. 1 is a diagrammatic, partially cross-sectional illustration of an embodiment of this invention.

As shown in FIG. 1, which, like the remaining figures is a diagrammatic illustration and is not drawn to scale, flue or combustion gases generated from burning combustible materials or waste containing radioactive and fissionable particles or contaminants are introduced, as indicated by arrow 12, into a suitably restricted passageway such as a venturi scrubber 15 and mixed therein with an appropriate quench or cooling liquid or solution, such as water, as known in the art to entrap particles and dissolve acid gases carried by or dispersed in the flue gases. The mixture of gas and liquid is conducted by conduit 18 communicating between port 19 in container, tower, receptacle or the like 20 and venturi 15. Tower 20 may be a generally vertical, elongated housing having an interior cylindrical wall 21 at a lower portion thereof and may comprise a cylindrical outer wall 23 having a bottom end wall or cover 26 and a top end wall or cover 28. Tower 20 includes means as described hereinbelow and illustrated in the drawings for geometrically restricting the volume of quench or cooling solution which may accumulate in order to prevent a criticality unsafe condition. A criticality unsafe condition is avoided by displacing the volume of cooling liquid over a large surface as will be described hereinbelow. Coaxially disposed within a lower portion of tower 20 and spaced from hollow cylindrical wall 23 is an inner hollow cylinder or cylindrical wall member 32, which connects with bottom end wall 26 as illustrated in the drawing. Cylindrical wall member 32 may be connected or otherwise joined to an annular, upwardly and outwardly sloping wall 35 which may be suitably connected to outer cylindrical wall 23 by such as welding or the like. Inner cylindrical wall member 32 contains at an upper portion thereof a plurality of ports, apertures, perforations, or the like 38 to allow passage of undissolved gases into chamber 42 formed by sloping wall 35, inner cylindrical wall 32, outer cylindrical wall 23, distribution plate 45, and bottom wall 26. Apertures 38 may be of a suitable size to permit maximum passsage of the flue gas, but sufficiently small to prevent the Raschig rings which comprise what is termed a scrub bed 52 from entering chamber 48.

A narrow, liquid retaining annular space or chamber 48 may be formed about the circumference of the elongated housing by wall 35, inner cylindrical wall 32, interior cylindrical wall 21, and bottom end wall 26 as shown in the drawing. Chamber 48 volume is determined from criticality considerations of the material to be processed and geometrically confines or limits the solution that may be accumulated to maintain a criticality safe condition; i.e., a criticality unsafe condition is avoided by displacing the volume of cooling liquid over a large surface such as defined by narrow annular chamber 48. For example, typical criticality considerations are the mass of the material, the isotopic concentration, the purity or percentage of chemical impurities within the material, the material used to make the walls of housing 20, and the density of the material.

Figure 2:
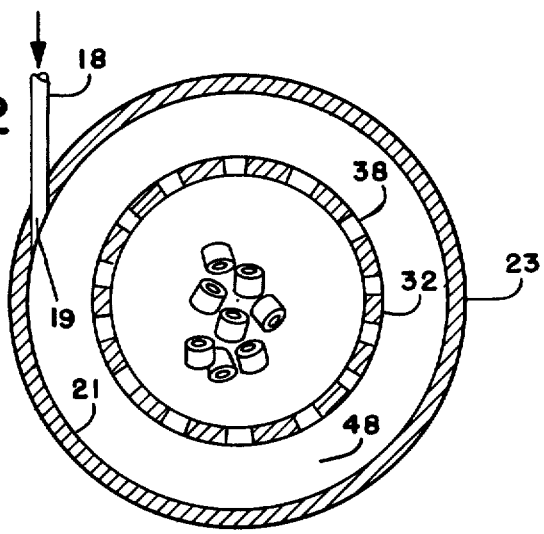
FIG. 2 is a cross section along lines 2—2 of FIG. 1.

The alignment of conduit 18 to interior cylindrical wall 21 and tower 20 through inlet port or portion 19 as shown in FIGS. 1 and 2 provides a tangential feed of the fluids (i.e., quench liquid from venturi 15 containing entrapped particles and dissolved gases as well as undissolved flue gases) into an upper portion of narrow annular chamber 48 such that the liquids injected into the chamber will follow inner wall 21 because of the centrifugal force and will eventually settle into the bottom portion of chamber 48 by gravity. It may be desirable that the tangential feed at inlet port or portion 19 be generally perpendicular to the generally vertical disposition of tower 20. The undissolved gases, however, will pass through ports 38 into chamber 42 which is filled with a scrub bed 52 comprised or formed of suitable packing or scrub material such as borosilicate glass Raschig rings. Although only a fraction of the total number of Raschig rings are shown for purposes of illustration, it is to be understood that chamber 42 in FIG. 1 (chamber 354 in FIG. 3) is completely filled with these rings to insure maximum intimate contact and scrubbing of scrub liquid or solution and flue gas as described hereinbelow as well as to avert a criticality unsafe condition.

A particle washing, entrapping or scrub liquid such as water is fed into chamber 55 formed by a portion of hollow cylindrical wall 23, distribution plate 45, and end wall 28 as shown in FIG. 1. For facility of illustration, the liquid used to cascade down bed 52 in a direction counter-current to the upward flow or flue gas, is referred to herein as a scrub liquid, while the liquid used to remove entrapped particles at venturi 15 is referred to as a quench or cooling liquid. As later described, scrub liquid may be converted to quench liquid after a pre-determined contaminant saturation level is exceeded.

Chamber 55 dimensions may be limited to that calculated for nuclear safe conditions for the specific system under consideration, or, as indicated by borosilicate glass Raschig rings 50 in chamber 55, it may be desirable to also provide packing material such as the glass Raschig rings 50 within chamber 55 in order to insure a criticality safe configuration, even if the scrub bed 52 becomes sufficiently clogged with fly ash or the like to prevent flow of scrub solution.

Distribution plate 45 has a plurality of apertures or openings 58 therethrough which permit distribution of scrub liquid fed in at port 60 into chamber 55 by means of conduit 62 throughout scrub bed 52 upper surface. This distribution of the scrub liquid efficiently bathes packing material or scrub bed 52 and thoroughly scrubs and maximizes contact between the upwardly ascending undissolved gases and the downwardly cascading or descending scrub liquid which finally collects at the bottom portion of chamber 42 and is recycled by means of appropriate conduits 64, 66, 68, 70 and 62 to chamber 55. Pump 74 may be provided intermediate conduits 64 and 66 to return the scrub liquid to the top of the tower. Valve 78 may be used to remove a portion of the scrub liquid from its scrubbing or cascading function into the venturi gas-particle entrapping cycle as will be described hereinbelow. A heat exchanger or cooler 82 may be disposed intermediate conduits 68 and 70 to cool the scrub solution prior to returning it to chamber 55. Valve 84 permits the introduction of additional fresh scrub solution through conduits 86 and 62 into chamber 55.

As stated hereinabove, the cooling solution descends by gravity to the bottom portion 87 of the annular chamber 48, which portion 87 functions as a sump, reservoir or surge space for the quench solution containing entrapped particles which may comprise greater than about 90% of the fly ash that was in the combustion or flue gases. Pump 88 which is connected to a lower portion of narrow annular chamber 48 by conduit 90, recycles the quench solution through conduits 90, 92, 98 and 100 back to the venturi 15 to further extract particles from combustion gases. Conduit 92 communicates between pump 88 and valve 94, which valve may be set or adjusted to remove some of the quench solution that is saturated or otherwise contains a large amount of fly ash and dissolved gases by conduit 95. Additional solution may be provided for quench purposes through proper setting of valve 78, the additional solution passing through conduit 97 communicating between conduit 90 and valve 78. Valve 94 may also be adjusted or set to provide continuity of flow of the quench solution through conduit 98 to criticality safe heat exchanger or cooler 99 which provides cooling of quench solution and thereafter through conduit 100 communicating between venturi 15 and cooler 99.

As shown in FIG. 1, conduit 100 branches off into separate branches 100a, 100b to feed quench or cooling liquid at an upper portion 15a of the venturi and again at the throat or restricted portion 15b of venturi 15. It may be desirable to feed the smaller portion of liquid flow at the venturi inlet or upper portion 15a to provide wall washing of the converging part of the venturi and thereby prevent buildup of solids on the converging portion through intermittent wet-dry operation. The major portion of the added cooling liquid may be fed in at the venturi throat 15b to efficiently entrap particles from the flue gas into the cooling liquid.

The flue gas is processed through venturi 15 to remove particles and acid gases therefrom into the cooling liquid which is retained in liquid retaining, narrow annular chamber 48, and the partially cleaned flue gas is thereafter processed through the scrub bed 52 to remove remaining particles and any other undissolved gases, and finally passed through perforations 58 in distributor plate 45 and is removed from tower 20 through port 102 communicating with conduit 104 either to the atmosphere or to other containers for further processing if desired.

Figure 3:
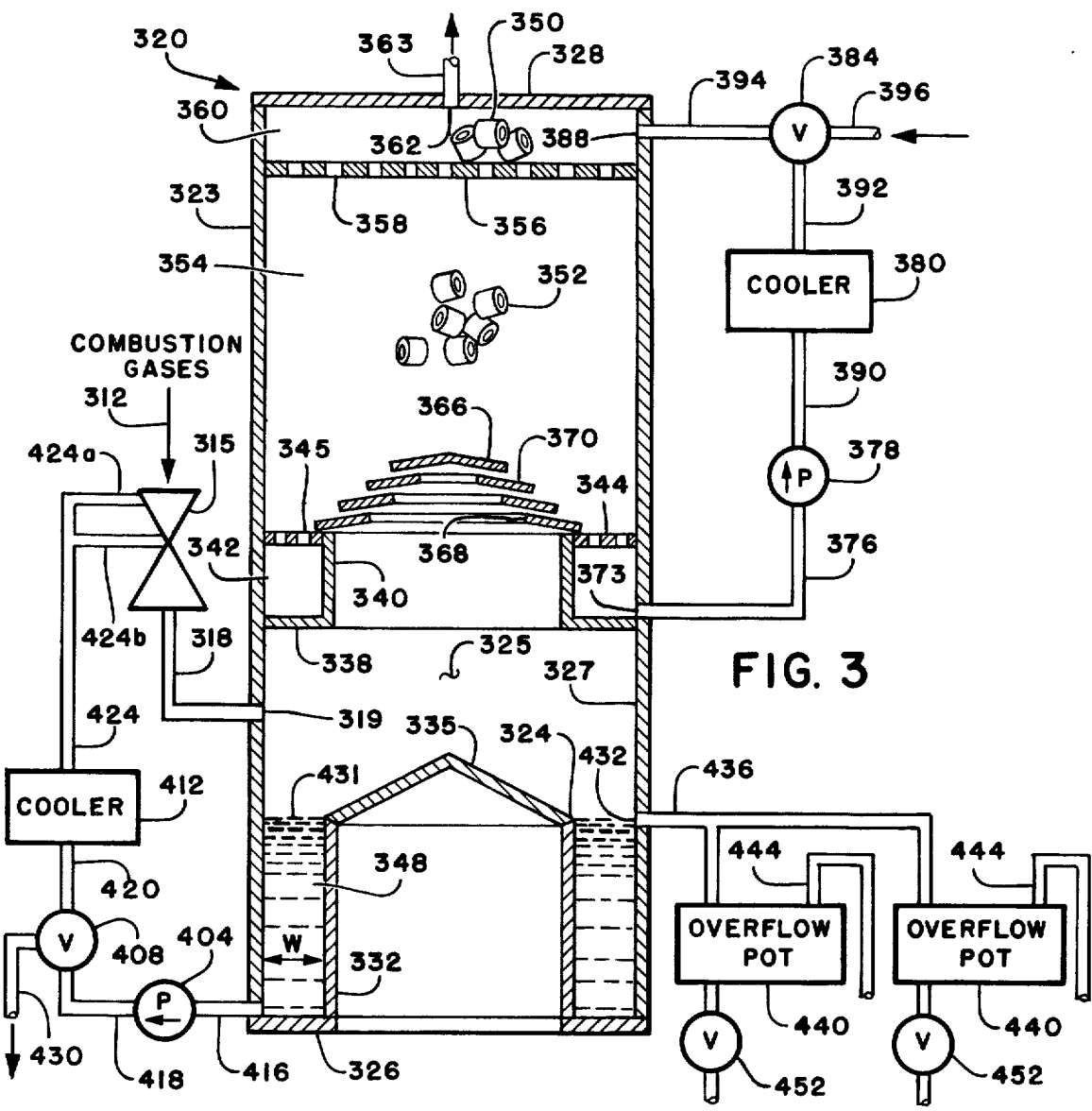
FIG. 3 is a diagrammatic, partially cross-sectional illustration of an alternate embodiment of this invention.

FIG. 3 illustrates an alternate embodiment of this invention. Combustion gases as indicated by arrow 312 are fed into venturi 315 and therein mixed with a suitable quench liquid. Conduit 318 communicating with port 319 through tower 320 outer wall 323 at interior cylindrical wall portion 327 and with venturi 315 tangetially passes gas and quench liquid mixtures from venturi 315 into compartment or chamber 325 in a manner similar to that described for FIG. 2. Tower 320, in addition to outer wall 323 and interior cylindrical wall portion 327 includes a ring shaped, annular bottom end wall 326, top end wall 328, and a hollow, generally cylindrical wall member 332 at a lower portion of tower 320 coaxially disposed in tower 320 and spaced from interior cylindrical wall portion 327 to form narrow annular space or chamber 348 therebetween. The lower end of inner hollow cylindrical wall 332 is connected to bottom end wall 326 and the top end of inner wall 332 is peripherally connected with bottom edge 324 of conical wall 335. Wall 335 closes or covers the coaxial opening in bottom end wall 326 central portion.

Tower 320 further contains at an intermediate portion above chamber 325, an inwardly projecting annular flange portion 338 extending to meet an annular rim portion or inner, hollow, coaxial cylindrical wall 340 which projects upwardly from adjacent the periphery of the flange portion 338, the ring or wall portion 340 spaced from outer wall 323 and forming a trough or chamber 342 as shown in FIG. 3. Scrub liquid may be collected in chamber 342 for recycling. There may also be an annular perforate grate or distributor plate 344 serving as upper end wall for chamber 342 which allows passage of scrub liquid through apertures 345 but which prevents packing material or scrub bed 352 from entering chamber 342. The bed 352 and packing material is as above described for FIG. 1, i.e., such as borosilicate glass Raschig rings. Chamber 354 may be defined by perforate grate or distributor plate 356, an upper portion of tower 320 outer hollow cylindrical wall 323, plate 344 and a shed deck or generally conical retaining wall 366. There are openings, apertures, or ports 358 through plate 356 to allow passage of scrub liquid from chamber 360 defined by upper end wall 328, a top portion of tower 320 hollow cylindrical wall 323 and distributor plate 356. As in FIG. 1, chamber 360 may likewise include a bed of packing material such as borosilicate glass Raschig rings to prevent a criticality unsafe condtion. Shed deck or generally conical retaining wall 366 comprises a plurality of overlapping shingles, decks, or the like which have openings, spacings or other passageways 368 therethrough either through vertical or horizontal spacing of shingles 370 which may be arranged in circular rows or the like to achieve the conical configuration of wall 366. Apertures 368 are desirably sufficiently large to permit maximum passage or flow of ascending flue gas while also sufficiently small so as to prevent passage of scrub bed 352 material into chamber 325. Spacing between shingles or the like permits the upward flow of partially cleaned flue gas through scrubber or packing material bed 352 within chamber 354 to thoroughly intermix the ascending gases and counter-current descending or cascading scrub liquid and thereby assure removal of any fly ash, other particles or acid gases that may still be contained by the undissolved gases. The cleaned gas is passed through apertures 358 into chamber 360 and out port 362 and conduit 363 to the atmosphere or to other treatment apparatus as desired.

Conical retaining wall 366 diverts the scrub liquid flow into trough or chamber 342 for removal through port 373 and conduit 376 to pump 378 which further transfers or recycles scrub liquid through cooler 380 and valve 384 through port 388 into chamber 360 by means of conduit 390 communicating between cooler 380 and pump 378, conduit 392 communicating between valve 384 and cooler 380, and conduit 394 communicating between valve 384 and chamber 360.

Heat exchanger or cooler 380, which may be of any appropriate type with the necessary dimensions for criticality safety, serves to cool the scrub liquid after it contacts the flue gas emitted from the incinerator. Valve 384 serves the same function as valve 84 in FIG. 1. Additional fresh scrub solution may be added to tower 320 through conduit 396 by proper adjustment of valve 384. If additional scrub solution is added, some may collect in trough 342 and, because of the added volume, overflow wall 340 and cascade or drop onto conical portion 335 and thereafter flow into annular trough or chamber 348.

The flue gas and particle entrapping quench liquid is tangentially fed into chamber 325 from venturi 315 via port 319. The particle entrapping liquid containing most of the fly ash is centrifugally spun within chamber 325 until, because of gravitational forces, it drops into trough or chamber 348 from whence it is recycled from a lower portion of chamber 348 by pump 404 through valve 408 and heat exchanger or cooler 412 into venturi 315 and thus returns to chamber 325 and to annular narrow chamber 348. Appropriate conduits 416, 418, 420, 424, and 318 as illustrated in FIG. 3 are used in recycling of the quench liquid. As in the embodiment of FIG. 1, cooling liquid is passed through conduit 424 which branches off into two conduits 424a and 424b to feed liquid both at the venturi inlet and at the throat or converged portion of the venturi for the reasons hereinabove stated in the FIG. 1 description.

Valve 408 employs conduit 430 to bleed off or remove quench liquid which may be saturated or otherwise contain a high percentage of entrapped fly ash or flue gas particles as well as dissolved acid gases. Trough or annular narrow chamber 348 is designed to remain criticality safe and yet provide a processing capability for a large volume of flue gas, such as greater than about 100 standard cubic feet per minute. This is accomplished by using a narrow chamber for displacing the volume of the cooling liquid over a large surface, i.e., using such as annular narrow chamber 348 so as to avoid a criticality unsafe condition.

As part of the design feature, the FIG. 3 embodiment may employ an overflow system to insure that a criticality safe condidtion exists. In this system, quench liquid exceeding the criticality safe liquid level 431 overflows into port 432 and is carried through conduit 436 to a suitable number of criticality safe overflow pots 440. After the pots gets full, conduits 444 may transport additional liquid to other overflow pots (not shown) or the like. Any number of pots or containers may be used as required and means such as a spigot or valve 452 may be used to drain these pots when desired. The overflow pots may contain suitable packing material such as borosilicate Raschig rings to contain a large amount of quench solution in a criticality safe mode.

Figure 4:
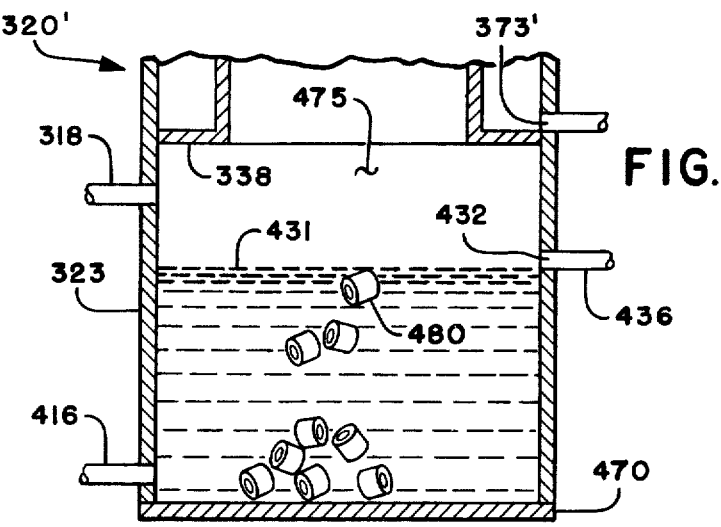
FIG. 4 is an alternate embodiment of a portion of the apparatus shown in FIG. 3.

FIG. 4 illustrates a cutaway view of an alternate embodiment of this invention wherein features of the FIG. 3 embodiment are employed. The housing or tower 320' now contains a bottom end plate 470 which, together with outer cylindrical wall 323 forms a chamber 475 within a lower portion of tower or scrubber 320'. A lower portion of chamber 475 filled with appropriate packing material 480 such as borosilicate Raschig rings, forms a sump or surge tank for the scrub solution. Overflow port 432 and conduit 436 are retained to insure that the criticality safe level 431 is not exceeded, and if exceeded, appropriate safety apparatus such as overflow pots 440 may prevent any criticality unsafe conditions.

Water may be preferably used as the scrub and quench solutions. If the gases contain hydrogen chloride gas from the incineration of polyvinyl chloride or other chloride containing waste materials, the water will absorb the hydrogen chloride from the flue gas. The venturi and scrub systems defined by this invention minimize the amount of waste liquor generation for a given scrubbing efficiency. The embodiment shown in this invention will remove the majority of liquid and fly ash from the flue gas steam and provide a criticality safe method of introducing the flue gas to the packed absorber bed. In general, greater than about 98% of the entrapped particles are removed from the flue gas as well as all the acid gases.

Radionuclide-contaminated waste that is incinerated will generate fly ash contaminated with these radionuclides wherein the fly ash is entrained or entrapped with the flue gas. If the system or apparatus described herein is to give or insure the necessary criticality safety even if the different chambers or conduits become completely filled with the scrub liquid and fly ash, then it may be desirable to (1) limit the annular quench tank or chamber 48 or 348 to a width W calculated to be nuclear safe for the system under consideration; (2) completely fill the scrubber portion with borosilicate Raschig ring packing which conform to the standard issued by the American National Standards Institute of ANSI N16.4-1971 entitled "Use of Borosilicate Glass Raschig Rings as a Neutron Absorber in Solutions of Fissile Material", which rings may be of about 1 inch length and about 1⅛ inch inner diameter and 1½ inch outer diameter. This requirement would apply also to the packing material 480 of chamber 475 in FIG. 4; (3) limit the venturi and all interconnecting conduits to a maximum diameter calculated to be nuclear safe for the specific system under consideration. It may further be desirable to use a plurality of venturies in order to achieve the desired fly ash extraction from the flue gas.

The embodiment shown in FIG. 3 may be desirable since there is less fly ash left in the absorber or packing material, such as borosilicate rings, thereby decreasing clogging material. Since there is an ample amount of chamber space for the gas to centrifugally spin around chamber 325, there is a greater potential for the quench liquid containing the entrapped fly ash to be removed in the lower portion of the scrubber.

In the design of FIG. 1, the annular chamber or space of nuclear safe dimensions provided (chamber 48) may eliminate the need for overflow pots and the like.

Examples of dimensions calculated for a specific set of parameters for the embodiments of FIGS. 1 and 3 are herein provided. Parameter variance requires a complete re-evaluation in order to determine permissible limits, optimum apparatus dimensions, gas flow rates, etc.

In FIG. 1, an example of apparatus dimensions for a given set of parameters is chamber 42 inner diameter — about 42 inches, tower 20 height — about 30 feet, chamber 48 width (W) — about 3 inches, chamber 48 height — from about 16 to about 20 feet, and chamber 55 height — about 2 feet.

For FIG. 3, an example of apparatus dimensions for a given set of parameters is chamber 354 inner diameter — about 42 inches, tower 320 height — about 30 feet, chamber 348 and 342 width (W) — about 3 inches, chamber 360 height — about 2 feet, chamber 354 height — about 8 feet, chamber 342 height — about 3 feet, chamber 348 height — about 6 feet, and chamber 325 height — about 10 feet.

An example of gas flow rate suitable for apparatuses of the above dimensions is about 7700 actual cubic feet per minute of flue gas at about 1722°F fed to the venturi. Recycle rate of the quench or cooling liquid to the venturi inlet is about 24 gallons per minute and to the throat of the venturi is about 90 gallons per minute, while recycle rate of the scrub liquid to the distribution chamber (55,360) is about 117 gallons per minute.

It should be understood that this invention provides a system capable of continuously removing radioactive fissionalbe contaminants in fly ash from flue gas. This invention provides a scrubber wherein large volumes of flue gases may be continuouosly passed therethrough without achieving or attaining a criticality unsafe condition since, by using a narrow trough or annular chamber for spreading out or dispersing the cooling liquid containing the radioactive fissionable contaminants, a criticality unsafe condition is avoided or prevented. Continuous processing is facilitated by incrementally adding fresh scrub liquid, withdrawing saturated quench liquid and converting scrub liquid to quench liquid.

What is claimed is:

1. A system for treating flue gas containing radioactive contaminants comprising means for mixing a cooling liquid with said flue gas, an elongated housing having a bottom wall and an interior cylindrical wall at a lower portion thereof, a hollow cylindrical wall member coaxially disposed within said housing at a lower portion thereof connected with said housing bottom wall and spaced from said interior cylindrical wall of said housing forming therewith about the circumference of said housing a narrow annular liquid-retaining chamber, a scrub bed of packing elements within said housing separate from said annular chamber, a conduit interconnecting said mixing means and said interior cylindrical wall having an inlet portion to said housing disposed tangentially to said interior wall of the housing for delivering said mixed flue gas and said cooling liquid containing entrapped particles from said mixing means and tangentially feeding into said housing, apertured wall means within the confines of said housing intermediate said scrub bed and said annular chamber and above said annular liquid retaining chamber for passing undissolved flue gas from said annular chamber to said scrub bed while inhibiting passage of said packing elements from said scrub bed into said annular chamber, a conduit connected to the upper portion of said housing for removing flue gas from the upper portion of said housing subsequent to passage through said bed, means for distributing scrub liquid at an upper portion of said scrub bed in countercurrent flow to said flue gas to mix with said flue gas and pass to a lower portion of said scrub bed, means for recycling said scrub liquid from said lower portion of said scrub bed to said distribution means, and means connected with a lower portion of said narrow annular liquid-retaining chamber for recycling cooling liquid from said annular chamber to said mixing means.

2. The system of claim 1 wherein said mixing means comprises a venturi scrubber.

3. The system of claim 1 wherein said scrub bed comprises a plurality of borosilicate glass Raschig rings.

4. The system of claim 1 further including an annular wall inwardly and downwardly projecting from said housing to an upper portion of said hollow cylindrical wall member, and wherein said apertured wall means is disposed intermediate said annular wall and said hollow cylindrical wall member, and both said annular wall and apertured wall means are coaxially disposed within said housing to close an upper portion of said annular chamber.

5. The system of claim 4 including means for transferring said scrub liquid to said cooling liquid.

6. The system of claim 1 together with means for cooling said scrub liquid during said scrub liquid recycling, means for cooling said cooling liquid during said cooling liquid recycling, means for removing cooling liquid containing a high percentage of entrapped particles during said cooling liquid recycling, and means for feeding fresh scrub liquid to said distributing means.

7. The system of claim 1 wherein said scrub bed is at a generally upper portion of said housing; an annular flange projects inwardly from an intermediate portion of said housing, and an annular rim portion projects upwardly from adjacent the inner periphery of said flange portion to form with said housing a scrub liquid annular chamber for collecting said scrub liquid; a perforate plate extends over said scrub liquid annular chamber for passage of scrub liquid into and restriction of said scrub bed from said scrub liquid annular chamber; said apertured wall means for passing undissolved flue gas comprises a generally conical, perforate, deck having its lower portion disposed over said annular rim portion; a collector conduit for collecting overflow of said cooling liquid, means for removing said overflow from said collector conduit; and a cover portion on said hollow cylindrical wall member to deflect scrub liquid to said narrow, annular liquid-retaining chamber.

* * * * *